(12) United States Patent
Yu et al.

(10) Patent No.: US 11,462,872 B1
(45) Date of Patent: Oct. 4, 2022

(54) MULTIPLE-WIDTH PLUG ARRANGEMENT FOR NETWORKING CONNECTIVITY

(71) Applicant: Amazon Technologies, Inc., Seattle, WA (US)

(72) Inventors: Paul Yu, Saratoga, CA (US); James Paul Rivers, Santa Cruz, CA (US); Poorya Saghari, San Jose, CA (US); Alaa Adel Mahdi Hayder, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 17/039,637

(22) Filed: Sep. 30, 2020

(51) Int. Cl.
*H01R 27/02* (2006.01)
*H01R 25/00* (2006.01)

(52) U.S. Cl.
CPC ........... *H01R 27/02* (2013.01); *H01R 25/006* (2013.01); *H01R 2201/06* (2013.01)

(58) Field of Classification Search
CPC ...... H01R 27/02; H01R 25/00; H01R 25/006; H01R 2201/06; H04B 1/38; H04B 10/40
See application file for complete search history.

(56) References Cited

U.S. PATENT DOCUMENTS

| 6,986,679 B1 * | 1/2006 | Aronson | H01R 13/6594 |
| | | | 439/541.5 |
| 9,759,879 B1 * | 9/2017 | Takai | H05K 1/117 |

* cited by examiner

*Primary Examiner* — Tho D Ta
(74) *Attorney, Agent, or Firm* — Kilpatrick Townsend & Stockton LLP (57) ABSTRACT

A cage assembly may define a part of a computing appliance. The assembly can include a cage formed by walls and defining a continuous interior volume bounded by a top face, a bottom face, a right face, a left face, a front face, and a rear face. A first edge connector may be within a leftward portion of the interior volume. A second edge connector may be within a rightward portion of the interior volume and positioned laterally from the first edge connector. The arrangement may permit engagement with multiple individual-width plugs (e.g., each bearing an individual paddle card) or a single plug (e.g., bearing multiple paddle cards spaced laterally from one another and aligned for engagement with the first and second edge connectors within the cage).

19 Claims, 5 Drawing Sheets

MULTIPLE-WIDTH PLUG ARRANGEMENT FOR NETWORKING CONNECTIVITY

BACKGROUND

Datacenters house collections of servers and networking hardware, including switches and routers. Often many different cabled connections between components in a particular device chassis are used to connect the components. Generally, having many different types of cable connectors increases cost and operational complexity. On the other hand, cable connectors need to satisfy a wide array of cabling scenarios.

BRIEF DESCRIPTION OF THE DRAWINGS

Various embodiments in accordance with the present disclosure will be described with reference to the drawings, in which.

DETAILED DESCRIPTION

Embodiments herein are directed to cabling arrangements and associated components for computing equipment, such as may be used in computer networks for data centers or other locations. The cabling arrangements can include plugs and associated receptacles that may be capable of receiving different sizes of plugs within a single space bounded by a given receptacle. For example, a given receptacle may be equally capable of receiving a pair of like-sized plugs side by side or receiving a single plug (e.g., that is wider than the combination of the pair of the like-sized plugs and/or wide enough to substantially occupy a full width of the receptacle). In usage, the receptacle may accordingly provide reverse compatibility among different sizes or form factors of plugs.

In an illustrative example, the receptacle may include a shell or cage featuring an opening on one end that allows insertion of one or more plugs into the cage in the lengthwise direction to engage pins or other structure of a connector interface at an opposite end of the length of the cage. The interior of the cage can house multiple instances of connector interface structures, such as a left edge connector in a leftward portion of the cage and a rightward edge connector in the rightward portion of the cage.

In one mode of operation in this illustrative example, the cage opening may allow insertion of two plugs side by side. For example, the two plugs may be the same size as one another, e.g., each having an individual-width of an equal value. When seated, the first individual-width plug can occupy a leftward portion of the cage and engage the leftward edge connector, while the second individual-width plug can occupy a rightward portion of the cage and engage the rightward edge connector (e.g., such that respective signals from the two individual-width plugs can be relayed through the leftward and rightward edge connectors into a computer, server, or other appliance for which the cage is installed). The individual-width plugs at adjacent facing sides (e.g., facing inwardly toward each other and away from lateral edges of the cage) may latch to a movable wall or other guide structure disposed within a central portion between the leftward and rightward portions of the cage, while opposite (or laterally-outward-facing) sides of the individual-width plugs may latch to the cage walls.

In an alternate mode of operation in this illustrative example, the cage opening may allow insertion of a multi-width plug that may have a width that is over two times or some other multiple of the individual-width plugs. The multi-width plug can occupy substantially the entire width of the cage or otherwise occupy part or all of the leftward, rightward, and central portions of the cage. For example, the multi-width plug during insertion into the cage may displace (or move into overlapping relationship with) the movable wall or other guide structure in the central portion of the cage. The multi-width plug may include two paddle cards that are sized and spaced to fit into the left and right edge connectors (e.g., such that signals from the multi-width plug can be bifurcated or otherwise subdivided for relaying through the leftward and rightward edge connectors into the computer, server, or other appliance for which the cage is installed). The multi-width plug at lateral sides may latch into walls of the cage, such as via the same structures utilized for latching the laterally-outward-facing of the individual-width plugs. Overall, the same cage structure may be capable of receiving either a single multi-width plug or a combination of individual-width plugs to provide signal transmission through the multiple edge connectors to the computer, server, or other appliance for which the cage is installed.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
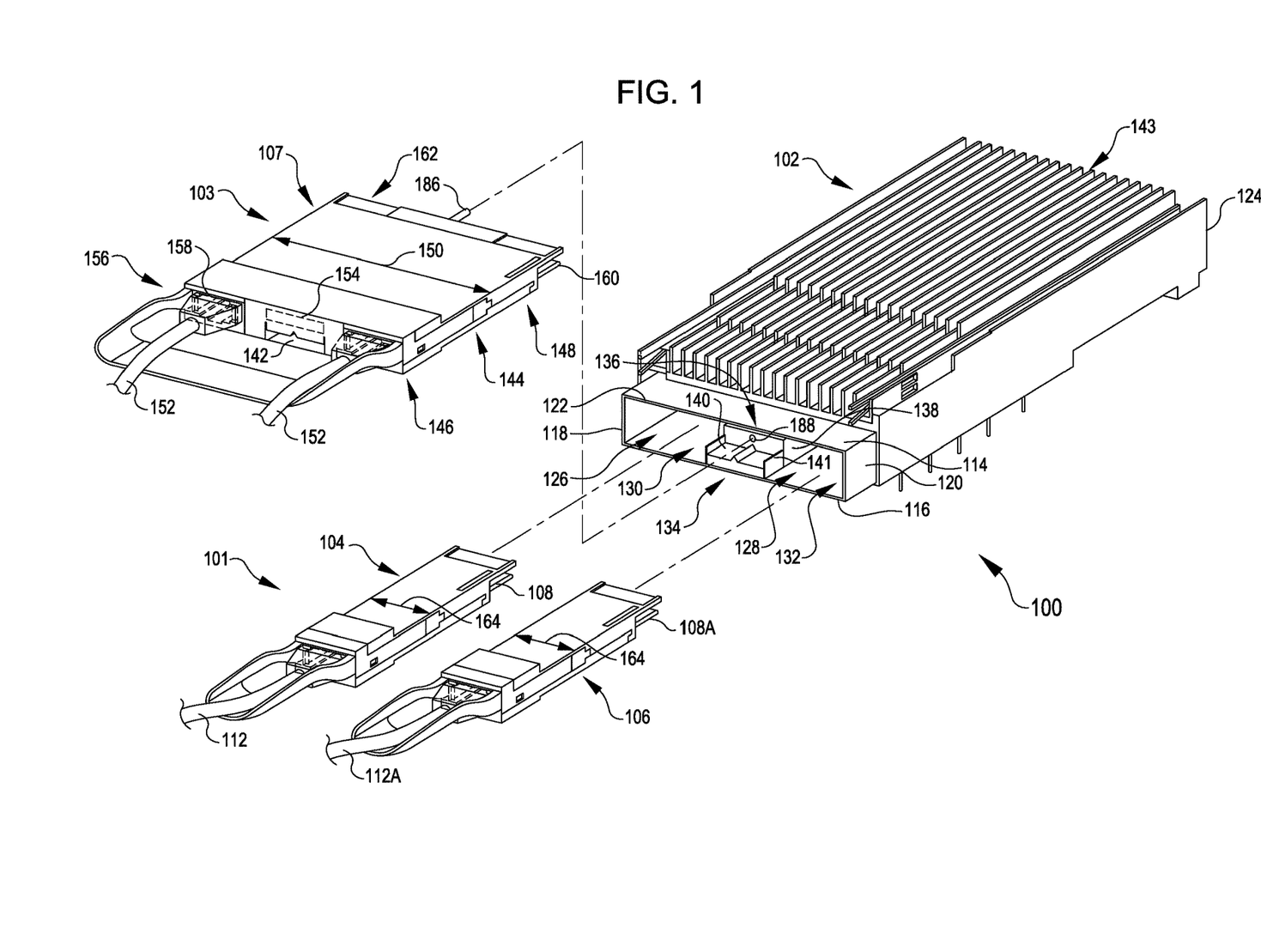
FIG. 1 is a perspective view of a cage for a cabling connection and different options of plugs that can be received therein in accordance with various embodiments.
Figure 2:
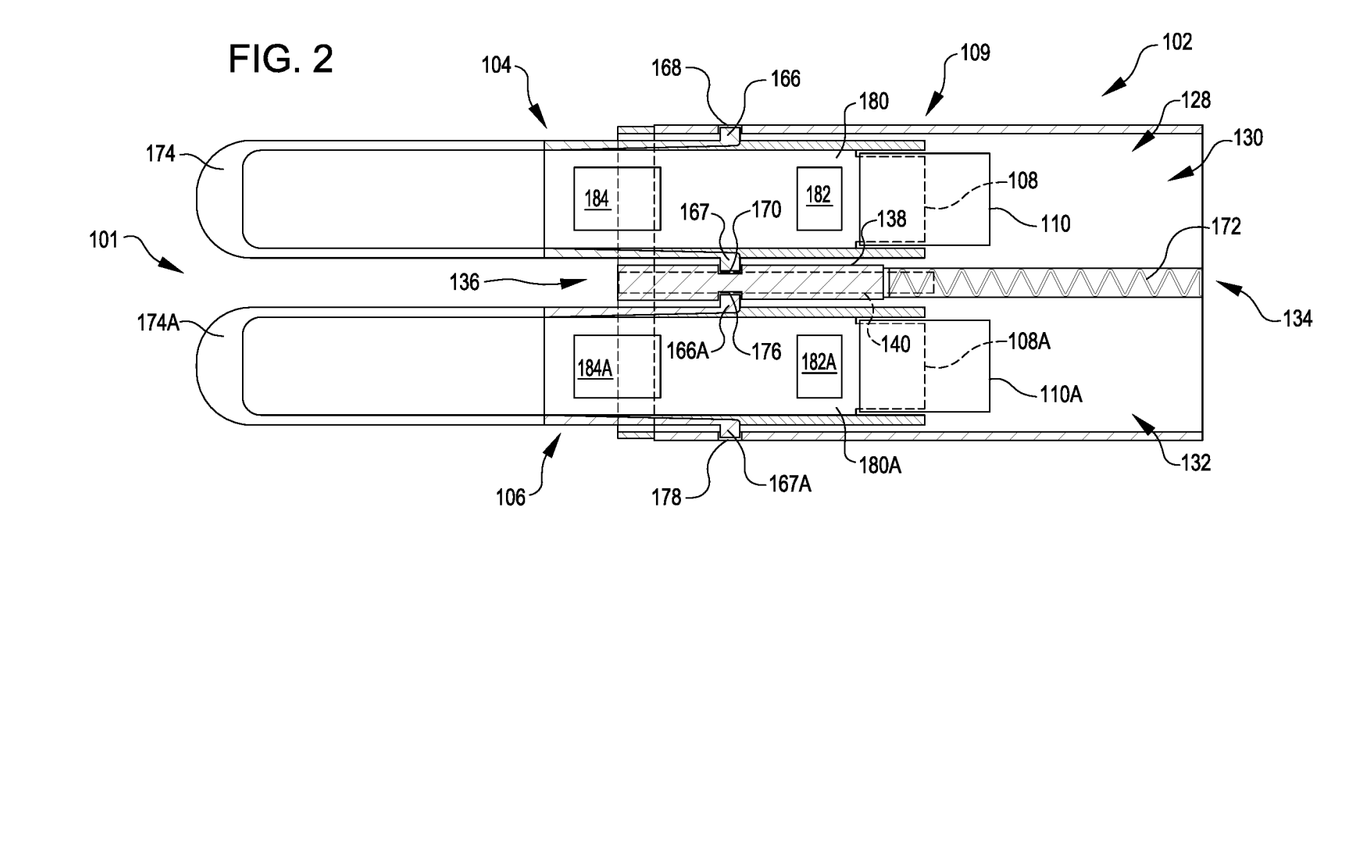
FIG. 2 is a top cutaway view of the cage of FIG. 1 in a state in which multiple plugs are received therein in accordance with various embodiments.
Figure 3:
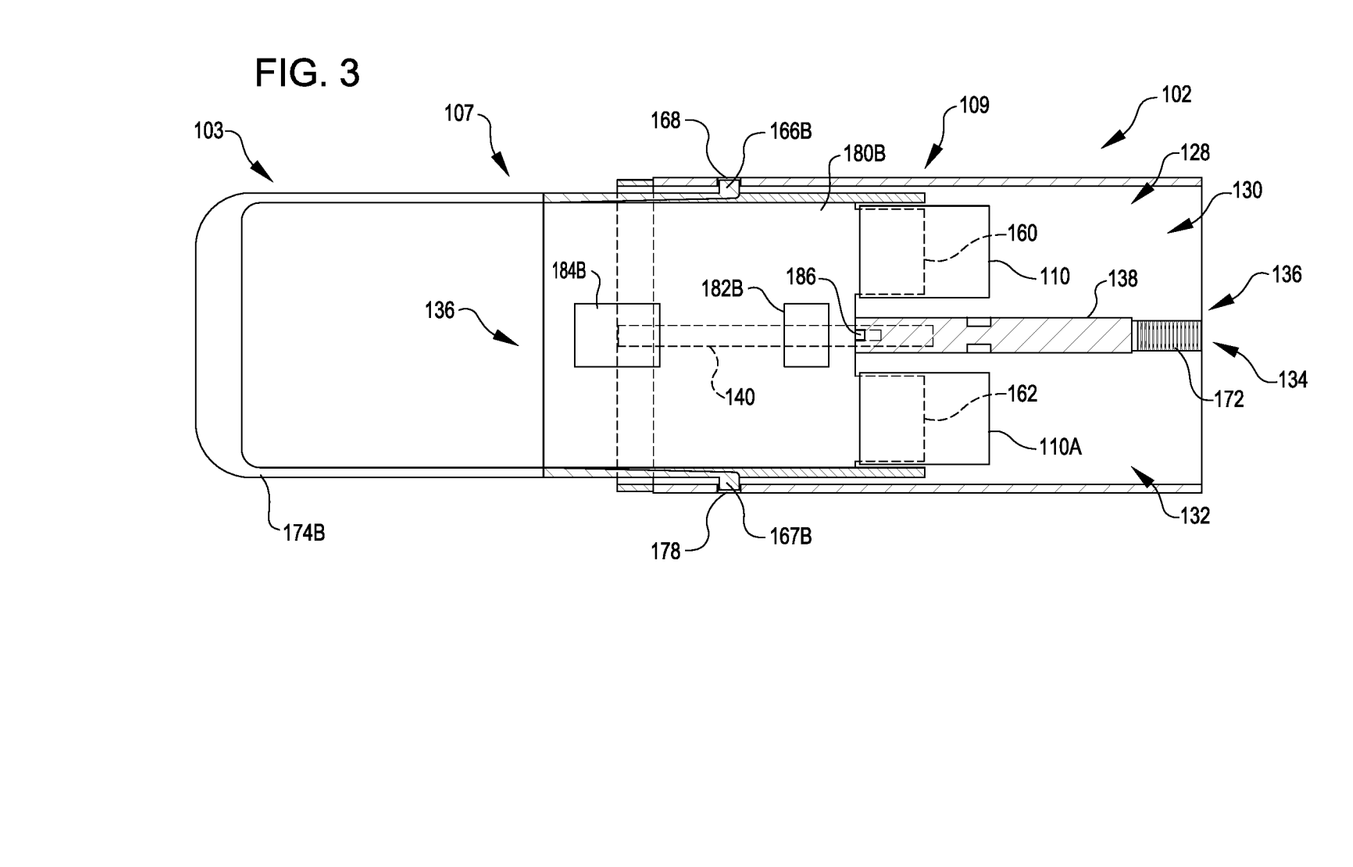
FIG. 3 is a top cutaway view of the cage of FIG. 1 in a state in which one plug is received therein in accordance with various embodiments.

Turning now to the figures, FIG. 1 depicts an assembly or system 100. The system 100 may provide a suitable conduit for transfer of electrical power, data, and/or other signals between appliances (such as between servers and/or network hard drive components for a data center). The system 100 in FIG. 1 includes a cage 102. The cage 102 may form at least a portion of a pluggable transceiver connector cage assembly, for example. The cage 102 includes features that allow alternate engagement of different sets of diverse varieties of plugs, such as a first plug set 101 having a first plug 104 and a second plug 106, and a second plug set 103 having a third plug 107 of a different type from what is represented in the first plug set 101. For example, FIG. 2 depicts the cage 102 in one mode of operation in which the first plug set 101 is received in the cage 102, while in contrast, FIG. 3 depicts the cage in another mode of operation in which the second plug set 103 is received in the cage 102.

Referring again to FIG. 1, the first plug 104 in FIG. 1 is associated with a cable 112. For example, the cable 112 may be releasably connected with the first plug 104 or integrally formed with the first plug 104. The first plug 104 in FIG. 1 can include a transceiver or other appropriate structure for establishing sufficient connection between the first plug 104 and structure of or within the cage 102 for transferring data, power, etc. between the cable 112 and a respective appliance fed by the cage 102. More generally, any physical medium attachment suitable for facilitating conversion of an electrical signal to or from another appropriate signal for a coupled medium may be utilized. The first plug 104 may correspond to any suitable form factor of pluggable module, pluggable media, pluggable transceiver, or other pluggable component. For example, the body and other components of the first plug 104 may be sized and arranged to meet any suitable standard for pluggable optical transceivers. In one non-limiting example, the first plug 104 may correspond to a small form-factor pluggable (SFP) transceiver, such as is commonly used for telecommunication and/or data communications applications. In another non-limiting example, the first plug 104 comprises an enhanced small form-factor pluggable (SFP+) transceiver or a compact small form-factor pluggable (CSFP) transceiver. In an additional non-limiting example, the first plug 104 comprises an RJ45 connector or a similar connector. Further non-limiting examples may include QSFP, QSFP+, QSFP28, QSFP56, QSFP56-DD, OSFP, or other standards that may be known in the art.

The first plug 104 in FIG. 1 includes an insertion portion 108 of a connector interface 109 that can mate with a receiving portion 110 (e.g., FIG. 2) of the connector interface 109. The receiving portion 110 of the connector interface 109 is shown positioned within the cage 102 in FIG. 2. The connector interface 109 can correspond to the combination of the insertion portion 108 and the receiving portion 110, e.g., such that engagement of the insertion portion 108 and the receiving portion 110 can complete connection of the connector interface 109 to allow transmission of power and/or data thereby. In FIG. 2, the insertion portion 108 and the receiving portion 110 are respectively depicted as a paddle card and an edge connector, although any other suitable structure may be utilized. The receiving portion 110 can be suitably coupled to a circuit board or other electrical appliance to provide electrical connection to plugs or cables received in the cage 102 such as the first plug 104, the second plug 106, or the third plug 107, for example.

The second plug 106 in FIG. 1 includes similar features to the first plug 104, and accordingly, similar features are denoted with like reference numbers having a suffix A. Thus, features of the first plug 104 and the second plug 106 may correspond to respective first and second instances of such features. For example, the insertion portion 108 of the first plug 104 may correspond to a first insertion portion 108 that may be distinguished from the second insertion portion 108A of the second plug 106. As another example, the first plug 104 and the second plug 106 can respectively be associated with a first cable 112 and a second cable 112A. In various examples, the first plug 104 and the second plug 106 may be replicas of one another (e.g., a single-stock-keeping unit or SKU), although different manufacturers or other variations may also be utilized.

The cage 102 can define a part or be coupled with a socket or other part of a server, network hard drive component, or other appliance for a data center or other environment. The cage 102 in FIG. 1 includes sidewalls that define respective faces of the cage 102, specifically, a top face 114, a bottom face 116, a left face 118, a right face 120, a front face 122, and a rear face 124. The orientation of these faces is described specifically with respect to the cage 102 and may differ from an orientation of an environment in which the cage 102 is implemented (such as in a server chassis assembly or element of another type of appliance). For example, the rear face 124 of the cage 102 is not limited to a particular orientation relative to the rear of an appliance, but depending on desired placement in implementation, may be suitably adjacent or remote relative to the rear of the appliance or may face toward, away, partially toward, or partially away from the rear of the appliance.

In FIG. 1, the front face 122 includes a front opening 126 that provides access in a longitudinal direction into the interior of the cage 102. The respective faces of the cage 102 in various aspects are defined by or correspond to respective side walls, such that side walls are not provided separate reference numbers herein from the respective faces. In various aspects, the respective faces and/or walls of the cage 102 extend parallel to the receiving portion 110 of the connector interface 109.

The cage 102 can define an interior volume 128, which may be bounded by the top face 114, the bottom face 116, the left face 118, the right face 120, the front face 122, and the rear face 124, for example. The interior volume 128 may be continuous between respective faces of the cage 102, which may include arrangements in which the continuous nature of the interior volume 128 is established on account of gaps remaining present around other structures positioned within the interior volume 128 instead of the interior volume 128 being interrupted or completely divided into separate volumes by integrally formed boundaries, corners, or other junctures between parts. In addition, although a rectangular cross-section is depicted for the cage 102, other forms of cross-section may also be utilized (including, but not limited to, round and/or non-uniform), and the cross-sectional size and/or shape of the cage 102 and/or related components (including, but not limited to, the first plug 104, the second plug 105, and the third plug 107) may differ or be the same as one another.

The interior volume 128 may include sub-regions, which may be suitable for receiving other structures of the system 100. For example, the interior volume 128 may include a leftward portion 130, a rightward portion 132, and a central portion 134 (e.g., positioned between the leftward portion 130 and the rightward portion 132).

A guide 136 may be positioned within the cage 102. For example, the guide 136 in FIG. 1 is shown in the central portion 134 of the interior volume 128. The guide 136 can include any suitable structure for aligning and/or securing other elements relative to the interior volume 128 or other element associated with the cage 102. For example, the guide 136 depicted in FIG. 1 includes a movable wall 138 and a base 140, although the cage 102 may be utilized with either or both or with some other structure. Respective parts of the guide 136 (such as the movable wall 138 and/or the base 140) can provide one or more surfaces against or along which other elements may slide or otherwise move or engage. The base 140 may remain stationary within the cage 102. The movable wall 138 may be capable of movement within or relative to the interior volume 128 of the cage 102. For example, the movable wall 138 may be sized and/or shaped to slide along or over an upper surface of the base 140 or may engage or face the top face 114 and/or bottom face 116 of the cage 102 (e.g., if the base 140 is absent or omitted).

The base 140 can include protrusions 141 suitable for engaging other components such as the movable wall 138, the first plug 104, the second plug 106, and/or the third plug 107. The protrusions 141 are shown in FIG. 1 as upwardly extending blades, although any other structure may be used, including, but not limiting to, fins, rails, or other members. In some aspects, the protrusions 141 may be sized for multiple alternative functions, such as for receipt within a mating groove 142 in the third plug 107 or in the movable wall 138, and/or for aligning and/or providing latching engagement for the first plug 104, the second plug 106, and/or the third plug 107.

The cage 102 can further include a heat sink 143. The heat sink 143 is depicted as a series of fins distributed across the top face 114 of the cage 102. However, other arrangements or patterns of fins may be utilized. As one example, fins or other structure of the heat sink 143 may be included directly on the first plug 104, the second plug 106, and/or the third plug 103 and may be sized and/or arranged for interacting with corresponding features of the cage 102 (such as being short enough to fit underneath the top face 114 of the cage 102 or sized for fitting into slots or channels that may be included in the cage 102 to allow fins or other structure to extend through the top face 114). Additionally or alternatively, the heat sink 143 may be supplemented or replaced with fans, conduits for water cooling or other coolant distribution, or any other suitable structure of a heat extraction system for extracting or dissipating heat from the cage 102 and/or components within. As a further example, slits or other suitable air vent structures may be included in the movable wall 138, the base 140, and/or other structure of the guide 136 to permit flow of air that may carry away heat from the first plug 104, the second plug 106, the third plug 103, and/or other structure within the cage 102.

The third plug 107 can include a body 144. The body 144 can be defined at least in part by a shell sized to fit at least in part within the cage 102 or other socket of an associated appliance. The body 144 can have a proximal end 146 and a distal end 148. The body 144 may have a width 150 that extends between lateral sides of the body 144.

The third plug 107 may be associated with one or more cables 152. The cable 152 may be a different or a matching type relative to the cable 112. The cable 152 can include suitable wiring, optical fibers, and/or other conduits for transmitting electrical power, data, and/or other signals therethrough. Although the cable 152 and associated components depicted and described herein may be particularly suited for optical transmissions, in some aspects, the cable 152 may be replaced with and/or include a conduit for other connection types, in addition or as alternatives, such as connections for acoustic communication, fluid communication, and/or electrical communication. As non-limiting examples, the cable 152 may include copper, glass, or other materials suitable for transmission of appropriate signals therethrough. The third plug 107 is depicted in FIG. 1 with two cables 152, although any number (such as one, two, or more than two) may be used. Moreover, the placement or style of connection for each cable 152 may vary from the details depicted. For example, at least one cable 152 may be secured at an alternate location 154 depicted in dashed lines in FIG. 1. In an illustrative example, the third plug 107 may be coupled with a cable 152 that may correspond to a type known as a multi-fiber push on (MPO), e.g., which may provide eight, twelve, sixteen, twenty-four, or other useful number of channels that may be handled and/or routed through the third plug 107. Use of a cable 152 that is MPO type may allow the third plug 107 to be utilized with only a single cable 152, for example.

Generally, at the proximal end, the third plug 107 may include an data interface 156. For example, the data interface 156 may correspond to the cable 152 (which may be an optical cable) and/or a port 158 in which the cable 152 is received or engaged.

At the distal end, the third plug 107 may include suitable structure for engaging other elements within the cage 102. For example, the third plug 107 in FIG. 1 includes a third insertion portion 160 and a fourth insertion portion 162. The third insertion portion 160 and the fourth insertion portion 162 are depicted as paddle cards and respectively thus may be referred to herein alternatively as a first paddle card 160 and a second paddle card 162, although other form factors can be utilized. The third insertion portion 160 and/or the fourth insertion portion 162 may be of a same type of connector interface 109 as the first plug 104 and/or the second plug 106. For example, as may be best seen in FIG. 3, the connector interface 109 can correspond to the combination of the third insertion portion 160 and the first receiving portion 110, e.g., such that engagement of the third insertion portion 160 and the first receiving portion 110 can complete connection of the connector interface 109 to allow transmission of power and/or data thereby.

Overall, the third plug 107 may include suitable structure for compatibility with any suitable form factor of pluggable module or transceiver. The third plug 107 may include or be a single pluggable module or transceiver, for example. Nevertheless, the third plug 107 may include multiple instances of features that are typically included individually instead of in multiples for a single pluggable module or transceiver. Thus, for example, inclusion in the third plug 107 of the first paddle card 160 and the second paddle card 162 (e.g., laterally spaced apart from one another) may differentiate the third plug 107 from the first plug 104 (e.g., in which the first insertion portion 108 may correspond to a single paddle card structure). To this end, the third plug 107 may alternatively be referred to as a duo plug (e.g., on account of including the first paddle card 160 and the second paddle card 162 as two separate structures), which may be in contrast to the first plug 104 and/or the second plug 106 being alternatively referred to as mono plug (e.g., on account of including only one insertion portion 108/108A).

The third plug 107 may differ from the first plug 104 and the second plug 106 in terms of the width 150 of the third plug 107. The width 150 of the third plug 107 may be larger than a combination of the pair of the first plug 104 and the second plug 106. For example, whereas the first plug 104 and the second plug 106 may each have an individual-width 164 (e.g., corresponding to a standard for a pluggable module for example), the width 150 of the third plug 107 may be a multiple of two or greater of the individual-width 164. To this end, the third plug 107 may alternatively be referred to as a multiple-width plug or multi-width plug or a multi-plug.

The front opening 126 of the cage 102 can be sized and shaped to alternately permit entry of the first plug set 101 or the second plug set 103. For example, the front opening 126 may permit insertion of the first plug 104 and the second plug 106 through the front face 122 of the cage 102. Referring to FIG. 2, as a result of entry, the first plug 104 may occupy a first berth positioned in the leftward portion 130 of the cage 102, and the second plug 106 may occupy a second berth positioned in the rightward portion 132 of the cage 102. Insertion into the cage 102 may allow the first insertion portion 108 of the first plug 104 and the first receiving portion 110 (e.g., a first edge connector) of the connector interface 109 to engage with one another. Similarly, the second insertion portion 108A of the second plug 106 can engage with a second receiving portion 110A (e.g., a second edge connector). The first receiving portion 110 and the second receiving portion 110A may be a same type of connector interface 109, e.g., such that either the first plug 104 or the second plug 106 may be interchangeably engaged with the first receiving portion 110 or with the second receiving portion 110A.

Suitable latching interfaces may be included to retain the first plug 104 and the second plug 105 in seated positions in the cage 102. For example, the latching interfaces may include arms and recesses for receiving the arms. As an illustrative example, in FIG. 2, the first plug 104 includes a first arm 166 and a second arm 167 that can be respectively received in a first recess 168 and a second recess 170. The first recess 168 is positioned in a wall along the left face 118 of the cage 102 (e.g., which may be a stationary wall). The second recess 170 is formed in a structure of the guide 136, such as in the base 140 (e.g., which may be stationary) or in the movable wall 138 (e.g., which may be mobile). For example, the movable wall 138 may be biased by a spring, magnet, or other biaser 172 arranged to bias the movable wall 138 into an extended position in which the movable wall 138 forms a barrier or partition between the berths for the first plug 104 and the second plug 106, e.g., which can position the second recess 170 in an appropriate position for latching with the first plug 104 in a fully seated position. The first plug 104 in FIG. 2 is also shown with a handle 174 that can be pulled to retract the first arm 166 and the second arm 167 respectively from the first recess 168 and the second recess 170 to facilitate removal of the first plug 104 from the cage 102, although any combination of structures can be utilized to facilitate latching and delatching.

Similar structure may be included to facilitate latching and delatching for the second plug 106, such as a third recess 176 (e.g., in the guide 136 and engageable by a first arm 166A of the second plug 106) and a fourth recess 178 (e.g., in a wall along the right face 120 of the cage 102 and engageable by a second arm 168A of the second plug 106).

When suitably seated, the first plug set 101 may provide connection for transmission to or from the appliance associated with the cage 102. For example, control signals, data, or power may be conveyed through different pins or channels from the edge connector 110 of the cage 102 to the first plug 104 through the insertion portion 108 and thus made available to components on a circuit board 180 of the first plug 104. The circuit board 180 of the first plug 104 may include electrical signal processing circuitry 182 that may be operationally coupled with active laser components or other elements of an optical system 184 capable of transmitting and/or receiving optical signals through the cable 112. For example, the electrical signal processing circuitry 182 may include elements (such as a digital signal processor, a clock and data recovery (CDR) component, a re-timer, a gear box, a transimpedance amplifier (TIA), a driver, a microcontroller, and/or other components) that may facilitate conversion or processing of electrical signals for transmission as optical signals or vice versa. Similar structure (e.g., electrical signal processing circuitry 182A and optical system 184A) may be included in the second plug 106. Additionally or alternatively, other structure may be implemented for conversion between first and second signal types. In various aspects, the movable wall 138 or other structure of the guide 136 can provide a barrier to electromagnetic interference (EMI) between the respective elements of the first plug 104 and the second plug 106.

Briefly referring back to FIG. 1, the front opening 126 of the cage 102 may permit insertion of the third plug 107 through the front face 122 of the cage 102 (e.g., as an alternative to receiving the first plug 104 and the second plug 106). Referring next to FIG. 3, as a result of entry, the third plug 107 may be positioned in each of the leftward portion 130, the rightward portion 132, and the central portion 134 of the interior volume 128 (e.g., occupying the berth for first plug 104, the berth for the second plug 106, and a space therebetween). For example, the third plug 107 may move in overlapping fashion over the base 140 of the guide 136 (if present) and/or may displace the movable wall 138 (if present). The biaser 172 may permit movement of the movable wall 138 to a withdrawn position in which the barrier is retracted in response to overcoming a biasing force of the biaser 172, for example.

Insertion into the cage 102 of the third plug 107 may allow the first paddle card 160 and the second paddle card 162 of the third plug 107 to respectively engage with the first receiving portion 110 (e.g., first edge connector) and the second receiving portion 110A (e.g., second edge connector) within the cage 102.

Suitable latching interfaces may be included to retain the third plug 107 in a seated position in the cage 102. As an illustrative example, the third plug 107 in FIG. 3 includes a first arm 166B and a second arm 167B that can be respectively received in the first recess 168 and the fourth recess 178 in the laterally outward walls of the cage 102 that were utilized to latch corresponding sides of the first plug 104 and second plug 106, and the first arm 166B and the second arm 167B of the third plug 107 can be retracted by operation of a handle 174B. However, the third plug 107 is not limited to such arrangements and may utilize any latching interfaces having structure that is compatible with (or independent of) structure utilized for latching the first plug 104 and/or second plug 106.

In some aspects, insertion of the third plug 107 may cause unlocking of the movable wall 138. For example, the movable wall 138 may include or be coupled with a lever, ratchet, or other suitable locking structure of a locking system capable of locking the movable wall 138 in the extended position. The locking system may include a button 188 (FIG. 1) or other unlocking feature that may be manipulated to engage the locking structure or otherwise release the unlocking structure. The third plug 107 may include a projection 186 or other feature sized and shaped for engaging or interacting with the button 188 or other unlocking feature. For example, the projection 186 may remain in engagement with the movable wall 138 while the third plug 107 is in a seated position (e.g., FIG. 3). Other arrangements are also possible, including, but not limited to arrangements in which the biaser 172 is omitted and the movable wall 138 is pushed and pulled between extended and retracted states by insertion and removal movement of the third plug 107 (e.g., in response to releasable engagement between the third plug 107 and the movable wall 138 that may be facilitated by the projection 186, the handle 174B that delatches the third plug 107 from walls of the cage 102, or other features).

When suitably seated, the third plug 107 may provide connection for transmission to or from the appliance associated with the cage 102. For example, control signals, data, or power may be conveyed through different pins or channels from the first edge connector 110 and the second edge connector 110A of the cage 102 to the third plug 107 through the third insertion portion 160 (e.g., first paddle card 160) and the fourth insertion portion 162 (e.g., second paddle card 162) and thus made available to components on a circuit board 180B of the third plug 107. The circuit board 180B of the third plug 107 may be at least partially within a shell of the third plug 107 and terminate distally with the first paddle card 160 and second paddle card 162 alongside one another and spaced apart laterally, for example. The circuit board 180B of the third plug 107 may include electrical signal processing circuitry 182B that may be operationally coupled with active laser components or other elements of an optical system 184B capable of transmitting and/or receiving optical signals through the data interface 156 (e.g., via one or more cables 152). For example, the electrical signal processing circuitry 182B may include elements (such as a digital signal processor, a clock and data recovery (CDR) component, a re-timer, a gear box, a transimpedance amplifier (TIA), a driver, a microcontroller, and/or other components) that may facilitate conversion or processing of electrical signals for transmission as optical signals or vice versa. Respective components of the electrical signal processing circuitry 182B and/or the optical system 184B can service one or multiple other components (such as one or both of the first paddle card 160 and the second paddle card 162, or one or more cables 152 or other elements of one or more data interfaces 156). Accordingly, in various aspects, the ability of components on the third plug 107 to service multiple others may allow redundant components to be eliminated and may result in more space being available on the circuit board 180B in the third plug 107 in comparison to numbers of corresponding components and available space on a combination of the circuit boards 180 and 180B in the first plug 104 and second plug 106. Moreover, additional space may be available on the circuit board 180B in the third plug 107 based on the circuit board 180B occupying additional space in the central portion 134 of the interior volume 128 in comparison to available space on a combination of the circuit boards 180 and 180B in the first plug 104 and second plug 106 that occupy the leftward portion 130 and the rightward portion without also occupying the central portion 134.

Figure 4:
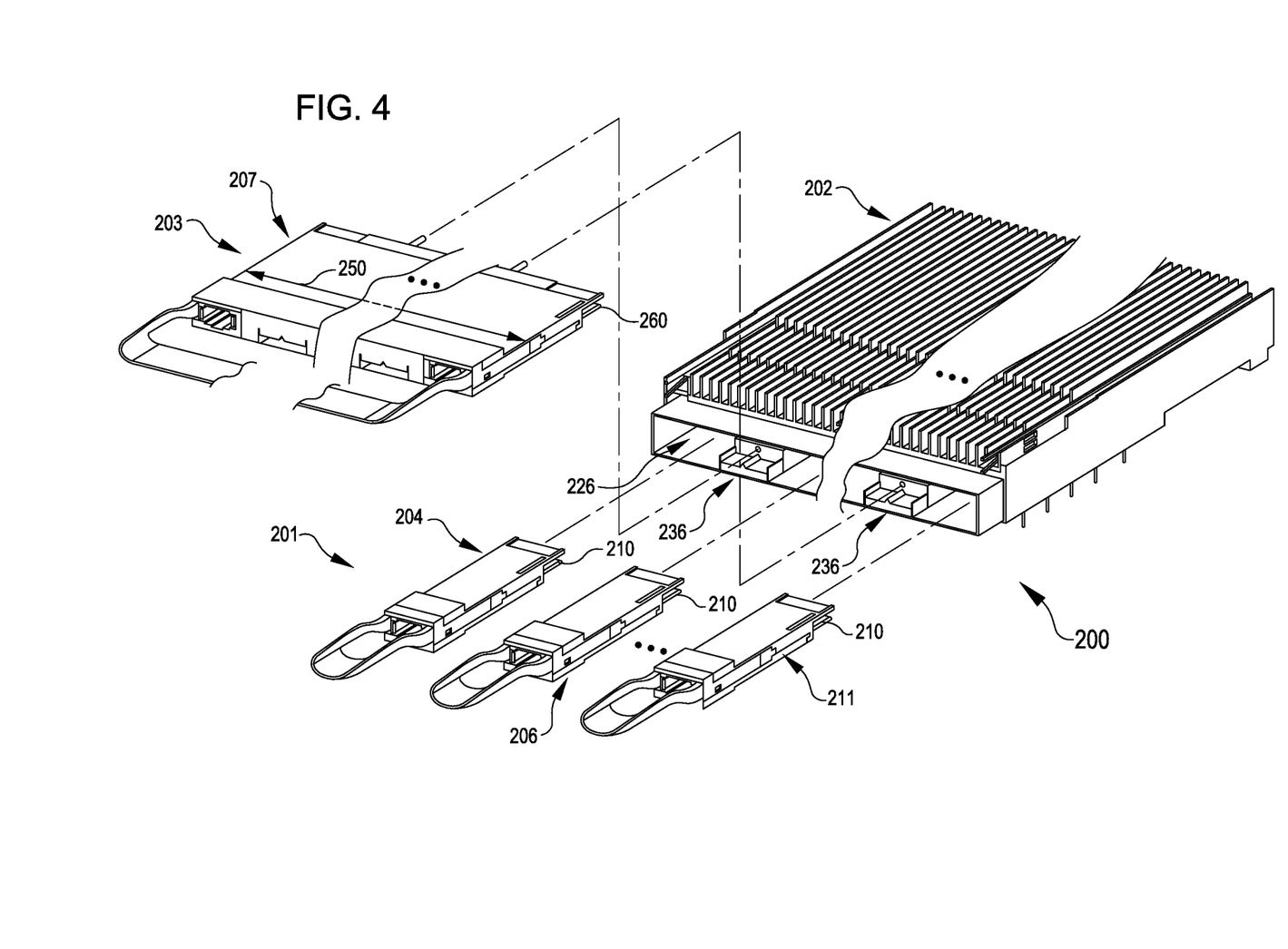
FIG. 4 is a perspective view of a cage for cabling connection and different options of plugs that can be received therein in accordance with various embodiments.

FIG. 4 depicts a system 200 that can include similar elements to those described herein for the system 100 of FIGS. 1-3 (although the system 200 is depicted without cables 112 or 152 for ease of viewing). FIG. 4 illustrates that embodiments herein are not limited to the duo arrangement of FIGS. 1-3 but may extend to any multiple number. For example, the first plug set 201 may include a first plug 204, a second plug 206, and any number of one or more additional plugs up to an Nth plug 211, all of which may have an individual-width. The cage 202 can include any suitable number of guides 236 (e.g., which may correspond to number M that is one less than the number N of the Nth plug 211). A second plug set 203 can be provided that includes a multiple-width plug 207 that can be inserted into the cage 202 in place of the first plug set 201. The multiple-width plug 207 may include a number of paddle cards 260 equal to the number N of the first plug set 201, for example. The multiple-width plug 207 can include a width 250 that can be larger than a combination of the individual-widths of the first plug set 201. In some aspects, the cage 202 may be sized to accept a multiple-width plug 207 alongside an individual-width plug within a shared front opening 226 of the cage 202. In use, any paddle card 260 from the multiple-width plug 207 (and/or any insertion portion 210 from an individual-width plug) may be utilized to transmit power, control signals, and/or data relative to the appliance served by the cage 202.

Figure 5:
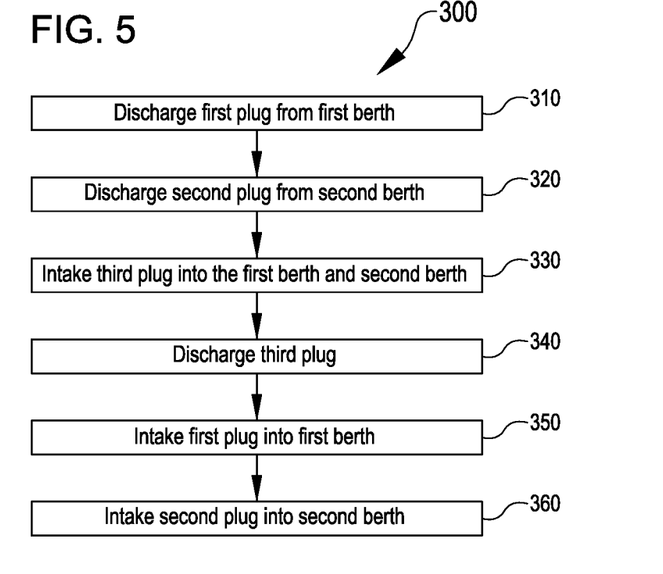
FIG. 5 is a flow chart showing an example of a process that can be implemented according to embodiments.

FIG. 5 is a flow chart showing an example of a process 300 that can be implemented according to embodiments. Although described primarily below with respect to components of the system 100 for simplicity, the process 300 additionally or alternatively can be practiced with components of the system 200.

The process 300 at 310 can include discharging a first plug from a first berth. For example, this may include discharging the first plug 104 from the leftward portion 130 of the cage 102. Discharging can include release of a first latching interface (e.g., first arm 166 and second arm 167), disconnection of a first insertion portion from a first receiving portion of a connector interface (e.g., insertion portion 108 and receiving portion 110), removal of the first plug from the first berth (e.g., first plug 104 from leftward portion 130), or any combination of these or other actions.

The process 300 at 320 can include discharging a second plug from a second berth. For example, this may include discharging the second plug 106 from the rightward portion 132 of the cage 102. Discharging can include release of a second latching interface (e.g., first arm 166A and second arm 167A), disconnection of a second insertion portion from a second receiving portion of a connector interface (e.g., insertion portion 108A and receiving portion 110A), removal of the second plug from the second berth (e.g., second plug 106 from rightward portion 132), or any combination of these or other actions.

The process 300 at 330 can include accepting or intaking a third plug into the first berth and the second berth, such as accepting or intaking a multi-width plug. For example, accepting the third plug may include introduction of the third plug into the leftward portion and the rightward portion of the cage, as well as into a central portion extending therebetween (e.g., into leftward portion 130, rightward portion 132, and central portion 134 of the interior volume 128 of the cage 102). Accepting the third plug additionally or alternatively may include displacement of a movable wall (e.g., displacing the movable wall 138 in response to movement of the third plug 107). Accepting the third plug additionally or alternatively may include engaging insertion portions of the third plug with receiving portions of the cage (e.g., receiving paddle cards 160, 162 into edge connectors 110, 110A).). Accepting the third plug additionally or alternatively may include engaging a latching interface (e.g., first arm 166B and second arm 167B) or any other actions.

The process 300 at 340 can include discharging the third plug. For example, this may include discharging the third plug 107 from the cage 102. Discharging can include release of a latching interface (e.g., first arm 166B and second arm 167B), disconnection of insertion portions from receiving portions (e.g., receiving paddle cards 160, 162 from edge connectors 110, 110A), removal of the third plug from the cage (e.g., third plug 107 from leftward portion 130, rightward portion 132, and central portion 134), or any combination of these or other actions.

The process 300 at 350 can include accepting or intaking the first plug into the first berth. For example, accepting the first plug can include introduction or insertion of the first plug into the first berth (e.g., first plug 104 into leftward portion 130), engaging the first latching interface (e.g., first arm 166 and second arm 167), engaging the first insertion portion with the first receiving portion of the connector interface (e.g., insertion portion 108 and receiving portion 110), or any combination of these or other actions.

The process 300 at 360 can include accepting or intaking a second plug into a second berth. For example, accepting the second plug can include introduction or insertion of the second plug into the second berth (e.g., second plug 106 into rightward portion 132), engaging the second latching interface (e.g., first arm 166A and second arm 167A), engaging the second insertion portion with the second receiving portion of the connector interface (e.g., insertion portion 108A and receiving portion 110A), or any combination of these or other actions.

Any combination and/or order of the actions in the process 300 may be utilized. In various aspects, actions may be supplemented or replaced based on other functions of components described herein.

Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
    a cage forming a part of an appliance comprising a computer server or a network hardware component, the cage defining an interior volume comprising a leftward portion, a rightward portion, and a central portion between the leftward portion and the rightward portion; and
    a movable wall positionable within the central portion in a location between a first berth corresponding to the leftward portion and a second berth corresponding to the rightward portion;
    wherein the cage is configured to accept:
        a first pluggable transceiver of an individual-width into the first berth and a second pluggable transceiver of the individual-width into the second berth; and
    wherein in an alternate mode of operation the cage is configured to accept:
        a multi-width pluggable transceiver comprising a width larger than a combination of the first and second pluggable transceivers of the individual-width, wherein the movable wall is retracted toward a rear of the cage when the multi-width pluggable transceiver is accepted within the leftward portion, the rightward portion, and the central portion of the interior volume of the cage.

2. The system of claim 1, wherein the movable wall is configured to unlock from the location between the first berth and the second berth in response to the multi-width pluggable transceiver being accepted into the cage.

3. The system of claim 2, wherein the movable wall is configured to lock in place in the location between the first berth and the second berth in response to removal of the multi-width pluggable transceiver from the cage.

4. The system of claim 1, wherein the first pluggable transceiver is configured to latch with the movable wall on one side and latch with a stationary wall of the cage on another side of the first pluggable transceiver.

5. A system comprising:
    a pluggable transceiver connector cage assembly, comprising:
        a cage formed by walls and defining a continuous interior volume bounded by a top face, a bottom face, a right face, a left face, a front face, and a rear face;
        a first edge connector within a leftward portion of the interior volume;
        a second edge connector within a rightward portion of the interior volume and positioned laterally from the first edge connector; and
        a movable wall movable into an extended position in which the movable wall forms a barrier between the leftward portion and the rightward portion of the interior volume, the movable wall further movable to a withdrawn position in which the barrier is retracted within the cage.

6. The system of claim 5, wherein the pluggable transceiver connector cage assembly further comprises a front opening extending through the front face and sized to permit insertion therethrough of alternatively:
    a single pluggable transceiver positionable in the leftward portion, the rightward portion, and a central portion of the interior volume for engagement simultaneously with the first edge connector and the second edge connector, and
a pair of pluggable transceivers individually positionable respectively in the leftward portion and the rightward portion for engagement respectively with the first edge connector and the second edge connector.

7. The system of claim 5, further comprising a guide positioned within a central portion of the interior volume and arranged to engage a pluggable transceiver inserted into the cage for alignment with at least one of the first edge connector or the second edge connector.

8. The system of claim 5, further comprising:
a biaser arranged to bias the movable wall into the extended position, the biaser further configured to permit movement of the movable wall to the withdrawn position in response to overcoming a biasing force of the biaser.

9. The system of claim 5, wherein the first edge connector corresponds to a connector interface type that is the same as the second edge connector.

10. The system of claim 5, further comprising a computer server or a network hardware component.

11. The system of claim 5, further comprising:
a pluggable transceiver comprising:
 a body having a proximal end and a distal end and defined at least in part by a shell sized to fit at least in part within a socket of a computer server or a network hardware component;
 a data interface at the proximal end, the data interface comprising a cable or a port configured for engaging a cable; and
 a circuit board situated at least partially within the shell and terminating at the distal end with a first paddle card and a second paddle card laterally alongside one another and respectively configured for separate receipt in the first edge connector and the second edge connector for transmission of first signals converted from or to second signals transmitted via the data interface.

12. The system of claim 11, wherein:
the first paddle card and the second paddle card each correspond to insertion portions of a connector interface type;
the first edge connector and the second edge connector each correspond to receiving portions of the connector interface type;
the pluggable transceiver comprises a multi-width pluggable transceiver that comprises a width larger than a combination of a pair of transceivers each of an individual-width; and
the pluggable transceiver connector cage assembly further comprises a movable wall positionable to provide latching interfaces on either side of the movable wall.

13. A system comprising:
a pluggable transceiver comprising:
 a body having a proximal end and a distal end and defined at least in part by a shell sized to fit at least in part within a socket of a computer server or a network hardware component;
 a data interface at the proximal end, the data interface comprising a cable or a port configured for engaging a cable;
 a circuit board situated at least partially within the shell and terminating at the distal end with a first paddle card and a second paddle card laterally alongside one another and each configured for separate receipt in respective separate edge connectors of the socket for transmission of first signals converted from or to second signals transmitted via the data interface; and
 a projection sized and shaped to engage with a locking system of a movable wall within the socket to cause unlocking of the movable wall in response to insertion of the pluggable transceiver, wherein the unlocking is operable to facilitate movement of the movable wall to a retracted state from an extended state in which latching interfaces on either side of the movable wall are positioned for engaging transceivers on opposite sides of the movable wall.

14. The system of claim 13, wherein the first paddle card corresponds to a connector interface type that is the same as the second paddle card.

15. The system of claim 14, wherein the connector interface type comprises a type selected from among a group including SFP, QSFP, QSFP+, QSFP28, QSFP56, QSFP56-DD, and OSFP.

16. The system of claim 13, wherein the pluggable transceiver further comprises a handle operable to disengage a latch for securing the pluggable transceiver relative to the socket.

17. The system of claim 13, further comprising the computer server or network hardware component.

18. The system of claim 17, wherein the computer server or network hardware component further comprises a pluggable transceiver connector cage assembly for receiving the pluggable transceiver, the pluggable transceiver connector cage assembly comprising:
a cage formed by walls and defining a continuous interior volume bounded by a top face, a bottom face, a right face, a left face, a front face, and a rear face;
a first edge connector within a leftward portion of the interior volume; and
a second edge connector within a rightward portion of the interior volume and positioned laterally from the first edge connector, wherein the first paddle card and the second paddle card of the pluggable transceiver are configured for separate receipt respectively in the first edge connector and the second edge connector.

19. The system of claim 18, wherein:
the first paddle card and the second paddle card each correspond to insertion portions of a connector interface type;
the first edge connector and the second edge connector each correspond to receiving portions of the connector interface type;
the pluggable transceiver comprises a multi-width pluggable transceiver that comprises a width larger than a combination of a pair of transceivers each of an individual-width; and
the pluggable transceiver connector cage assembly further comprises the movable wall positionable to provide the latching interfaces on either side of the movable wall.

* * * * *